United States Patent
Tucker

(10) Patent No.: US 11,049,333 B2
(45) Date of Patent: Jun. 29, 2021

(54) ON-COMPONENT TRACKING OF MAINTENANCE, USAGE, AND REMAINING USEFUL LIFE

(71) Applicant: Bell Helicopter Textron Inc., Fort Worth, TX (US)

(72) Inventor: Brian Tucker, Fort Worth, TX (US)

(73) Assignee: TEXTRON INNOVATIONS INC., Fort Worth, TX (US)

(*) Notice: Subject to any disclaimer, the term of this patent is extended or adjusted under 35 U.S.C. 154(b) by 476 days.

(21) Appl. No.: 15/879,207

(22) Filed: Jan. 24, 2018

(65) Prior Publication Data

US 2019/0080524 A1    Mar. 14, 2019

Related U.S. Application Data

(60) Provisional application No. 62/558,701, filed on Sep. 14, 2017.

(51) Int. Cl.
  *G07C 5/00*     (2006.01)
  *B64F 5/60*     (2017.01)
  (Continued)

(52) U.S. Cl.
  CPC ............ *G07C 5/006* (2013.01); *B64F 5/60* (2017.01); *G05B 23/0283* (2013.01);
  (Continued)

(58) Field of Classification Search
  CPC ............ F25D 23/126; F25D 2700/00; F25D 2323/122; F25D 2331/806
  (Continued)

(56) References Cited

U.S. PATENT DOCUMENTS 6,219,597 B1    4/2001  Longere
6,738,748 B2    5/2004  Wetzer
  (Continued)

FOREIGN PATENT DOCUMENTS

DE    102008062630 A1    6/2010
EP        3096269 A1    11/2016
  (Continued)

OTHER PUBLICATIONS

EPO Examination Report for EP Application No. 18162679.7 dated Jun. 18, 2019, 4 pages.
  (Continued)

*Primary Examiner* — Maceeh Anwari
(74) *Attorney, Agent, or Firm* — Patent Capital Group

(57) ABSTRACT

One embodiment is a system including a component for installation on a vehicle comprising a central maintenance computer ("CMC"); a configuration/maintenance module ("CMM") associated with the component and including memory for storing component information, a sensor for detecting a condition and generating data indicative thereof; a microprocessor for processing the sensor data and updating the component information with the processing results; and a communications interface between the CMM and the CMC. The system further includes a remaining useful life ("RUL") module associated with the component that periodically updates an RUL, the RUL module periodically updating an RUL value for the component and communicating the updated RUL value to the CMM for storage in the memory. The CMC communicates with the CMM to update the component information included in the memory based on information input to the CMC by a user or changes in a condition of the vehicle.

20 Claims, 7 Drawing Sheets

(51) Int. Cl.
*G07C 5/08* (2006.01)
*G05B 23/02* (2006.01)

(52) U.S. Cl.
CPC .. *G07C 5/0841* (2013.01); *G05B 2219/23193* (2013.01); *G05B 2219/32234* (2013.01); *G07C 2205/02* (2013.01)

(58) Field of Classification Search
USPC ........................................................ 701/32.9
See application file for complete search history.

(56) References Cited

U.S. PATENT DOCUMENTS

| | | | |
|---|---|---|---|
| 7,174,233 | B1 | 2/2007 | Blackshear et al. |
| 7,457,763 | B1 | 11/2008 | Garrow et al. |
| 7,983,809 | B2 | 7/2011 | Kell et al. |
| 7,984,146 | B2 | 7/2011 | Rozak et al. |
| 9,120,271 | B2 | 9/2015 | Bell |
| 2001/0032103 | A1 | 10/2001 | Sinex |
| 2001/0032110 | A1 | 10/2001 | Sinex |
| 2003/0061261 | A1 | 3/2003 | Greene |
| 2003/0191563 | A1 | 10/2003 | Eagleton et al. |
| 2003/0195675 | A1 | 10/2003 | Felke et al. |
| 2004/0167907 | A1 | 8/2004 | Wakefield et al. |
| 2005/0055239 | A1 | 3/2005 | Farmer |
| 2005/0065842 | A1 | 3/2005 | Summers |
| 2005/0171661 | A1 | 8/2005 | Abdel-Malek et al. |
| 2005/0240555 | A1 | 10/2005 | Wilde et al. |
| 2006/0089846 | A1 | 4/2006 | Middlebrook |
| 2006/0224357 | A1 | 10/2006 | Taware et al. |
| 2006/0235707 | A1 | 10/2006 | Goldstein et al. |
| 2007/0124223 | A1 | 5/2007 | Avery et al. |
| 2007/0294052 | A1 | 12/2007 | Stathis et al. |
| 2009/0063238 | A1 | 3/2009 | Storzum et al. |
| 2009/0164490 | A1 | 6/2009 | Wininger et al. |
| 2010/0042283 | A1 | 2/2010 | Kell et al. |
| 2010/0050065 | A1 | 2/2010 | Hooks |
| 2010/0125379 | A1 | 5/2010 | Fournier et al. |
| 2011/0082717 | A1 | 4/2011 | Saad et al. |
| 2011/0270482 | A1 | 11/2011 | Holzer |
| 2012/0283963 | A1 | 11/2012 | Mitchell et al. |
| 2013/0166135 | A1 | 6/2013 | Dunsdon |
| 2016/0342920 | A1 | 11/2016 | Tucker et al. |
| 2016/0342930 | A1 | 11/2016 | Tucker et al. |
| 2016/0342956 | A1 | 11/2016 | Tucker et al. |
| 2016/0343044 | A1 | 11/2016 | Tucker et al. |
| 2017/0017736 | A1* | 1/2017 | Beale ................. G06Q 10/20 |

FOREIGN PATENT DOCUMENTS

| | | | |
|---|---|---|---|
| EP | 3267375 | A1 | 1/2018 |
| EP | 3457243 | A1 | 3/2019 |
| EP | 3457243 | B1 | 5/2020 |
| WO | 2007149181 | A2 | 12/2007 |
| WO | 2007149181 | A3 | 12/2007 |
| WO | 2009085476 | A1 | 7/2009 |
| WO | 2010070070 | A1 | 6/2010 |
| WO | 2015131193 | A1 | 9/2015 |

OTHER PUBLICATIONS

Summons to Attend Oral Proceedings Pursuant to Rule 115(1) EPC in European Patent Application Serial No. 17177724.6 dated Jun. 19, 2018 (11 pages).
USPTO Final Office Action in U.S. Appl. No. 14/715,773, dated Jul. 26, 2018, 29 pages.
EPO Decision to Refuse Patent Application in European Patent Application Serial No. 17177724.6 dated Dec. 3, 2018, 23 pages.
Examination Report in European Patent Application Serial No. 18162679.7 dated Oct. 30, 2018, 12 pages.
USPTO Non-Final Office Action in U.S. Appl. No. 14/715,715, dated Aug. 9, 2018; 28 pages.
EPO Official Action in EP Patent Application Serial No. 17177724.6 dated Nov. 28, 2017, 6 pages.
EPO Search Report in EP Patent Application Serial No. 17177724.6 dated Sep. 28, 2017, 4 pages.
Examination Report in European Patent Application Serial No. 15178513.6 dated May 3, 2016 (5 pages).
Extended Search Report in European Patent Application Serial No. 15178513.6 dated Feb. 19, 2016 (3 pages).
Provision of the Minutes of the Oral Proceedings and Decision to Refuse the Application in EP Patent Application Serial No. 15178513.6 dated Aug. 1, 2017, 35 pages.
Summons to Attend Oral Proceedings Pursuant to Rule 115(1) EPC in European Patent Application Serial No. 15178513.6 dated Dec. 15, 2016, (10 pages).
USPTO Final Rejection in U.S. Appl. No. 14/715,783, dated Feb. 28, 2018, 72 pages.
USPTO Final Rejection in U.S. Appl. No. 14/715,736, dated Jan. 11, 2019, 19 pages.
EPO Examination Report for EP Application No. 18162679.7 dated Feb. 25, 2019, 9 pages.
EPO Search Report for EP Application No. 18162679.7 dated Feb. 12, 2019, 6 pages.
USPTO Non-Final Office Action in U.S. Appl. No. 14/715,736, dated Jun. 28, 2018.
USPTO Final Rejection in U.S. Appl. No. 14/715,736, dated Jan. 16, 2018.
USPTO Final Rejection in U.S. Appl. No. 14/715,783, dated Mar. 16, 2017.
USPTO Non-Final Office Action in U.S. Appl. No. 14/715,736, dated Sep. 22, 2017.
USPTO Non-Final Office Action in U.S. Appl. No. 14/715,773, dated Dec. 29, 2017.
USPTO Non-Final Office Action in U.S. Appl. No. 14/715,783, dated Jul. 7, 2016.
USPTO Non-Final Office Action in U.S. Appl. No. 14/715,783, dated Oct. 12, 2017.
CNIPA First Office Action for CN Application Serial No. 201810503368.8 dated Oct. 9, 2020, English translation (11 pages); CN First Office Action (21 pages).
EPO Extended Search Report for EP Application No. 20163275.9 dated Jun. 18, 2020.

* cited by examiner

ON-COMPONENT TRACKING OF MAINTENANCE, USAGE, AND REMAINING USEFUL LIFE

CLAIM OF PRIORITY

This application claims the benefit of priority under 35 U.S.C. § 119(e) to U.S. Provisional Application Ser. No. 62/558,701, entitled "ON-COMPONENT TRACKING OF MAINTENANCE, USAGE, AND REMAINING LIFE," filed Sep. 14, 2017. The disclosure of this prior application is considered part of (and are incorporated by reference in) the disclosure of this application.

TECHNICAL FIELD

This disclosure relates in general to the field of aircraft and, more particularly, though not exclusively, to a system for enabling on-component tracking of maintenance, usage, and remaining life of aircraft components.

BACKGROUND

Tracking aircraft component usage and maintenance typically involves manual creation and maintenance of historical service records. That is, when an aircraft maintainer installs, removes, inspects, and/or services a component, the maintainer creates or updates the historical service records. Specifically, for a particular component, aircraft maintenance personnel might create and maintain a set of records including such information as installation dates, hours of usage, removal dates, service history, inspection history, maintenance/overhaul activities, etc. The records might be kept in physical records (e.g., paper documents) or electronically in a centralized location.

SUMMARY

According to one aspect of the present disclosure, a system includes a vehicle component for installation on a vehicle, the vehicle including a central maintenance computer ("CMC"); and a configuration/maintenance module ("CMM") associated with the vehicle component. In certain embodiments, the CMM includes a non-volatile memory including information regarding the vehicle component, the vehicle component information comprising at least one of configuration data for the vehicle component, maintenance records for the vehicle component, usage history for the vehicle component, environmental history for the vehicle component, at least one damage model for the vehicle component, and at least one remaining useful life ("RUL") value for the vehicle component; a sensor that detects a condition of the vehicle component and generates data indicative of the detected condition; a microprocessor that processes the data generated by the sensor and updates the vehicle component information using results of the processing; and a communications interface that enables communication between the CMM and the CMC. The system further includes an RUL module associated with the vehicle component, the RUL module periodically updating the at least one RUL value for the vehicle component based on at least one of the information stored in the CMM, current information obtained from sensors associated with the vehicle, and projected future use information, and communicating the updated at least one RUL value to the CMM for storage in the non-volatile memory. The CMC communicates with the CMM to update the vehicle component information included in the non-volatile memory based on at least one of information input to the CMC by a user and changes in a condition of the vehicle.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
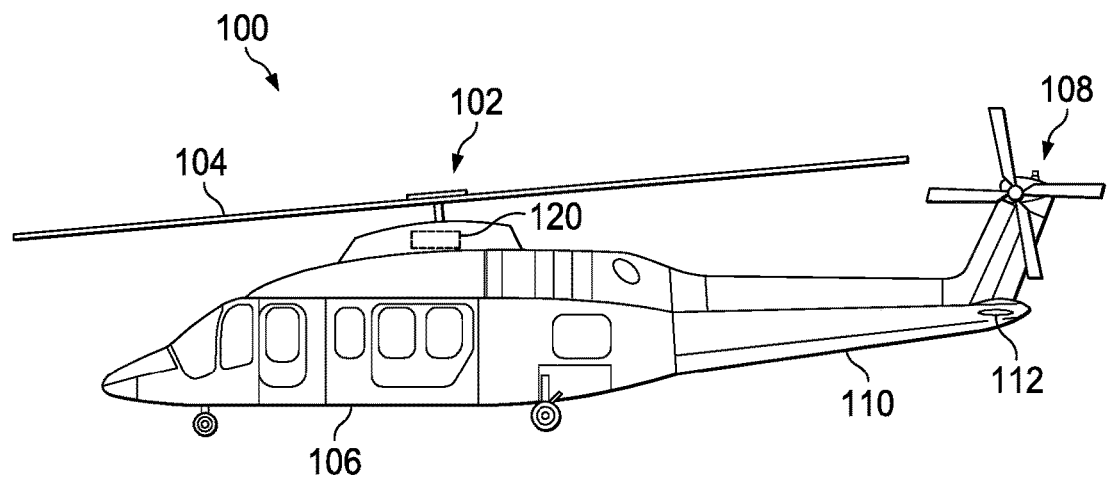
FIGS. 1A-1B are simplified schematic diagrams of an example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom' or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
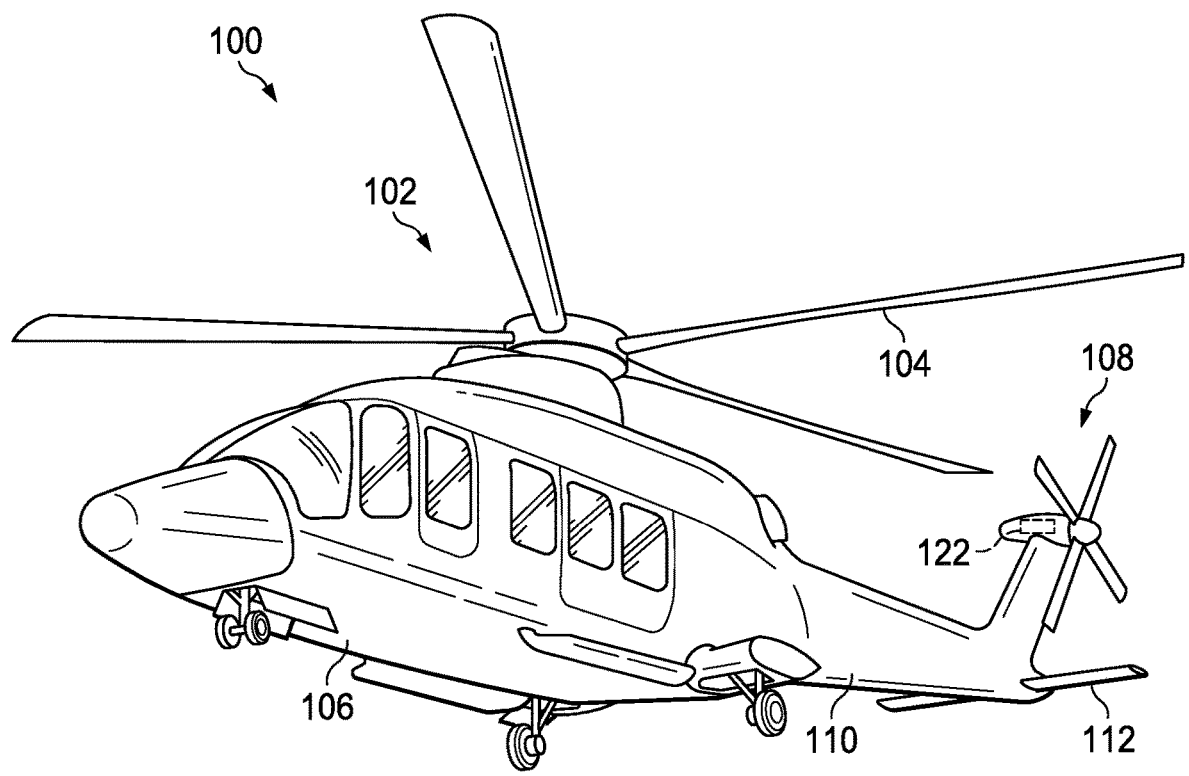

FIGS. 1A-1B illustrate an example embodiment of a rotorcraft 100. FIG. 1A portrays a side view of rotorcraft 100, while FIG. 1B portrays an isometric view of rotorcraft 100. Rotorcraft 100 includes a rotor system 102 with a plurality of rotor blades 104. The pitch of each rotor blade 104 can be managed or adjusted in order to selectively control direction, thrust, and lift of rotorcraft 100. Rotorcraft 100 further includes a fuselage 106, tail rotor or anti-torque system 108, an empennage 110, and a tail structure 112. In the illustrated embodiment, tail structure 112 may be used as a horizontal stabilizer. Torque is supplied to rotor system 102 and anti-torque system 108 using at least one engine and at least one gearbox. At least one gearbox 120 associated with rotor system 102 is illustrated in the embodiment of FIG. 1A. In some embodiments, anti-torque system 108 may also include an associated at least one gearbox 122, as illustrated in the embodiment of FIG. 1B.

Figure 2:
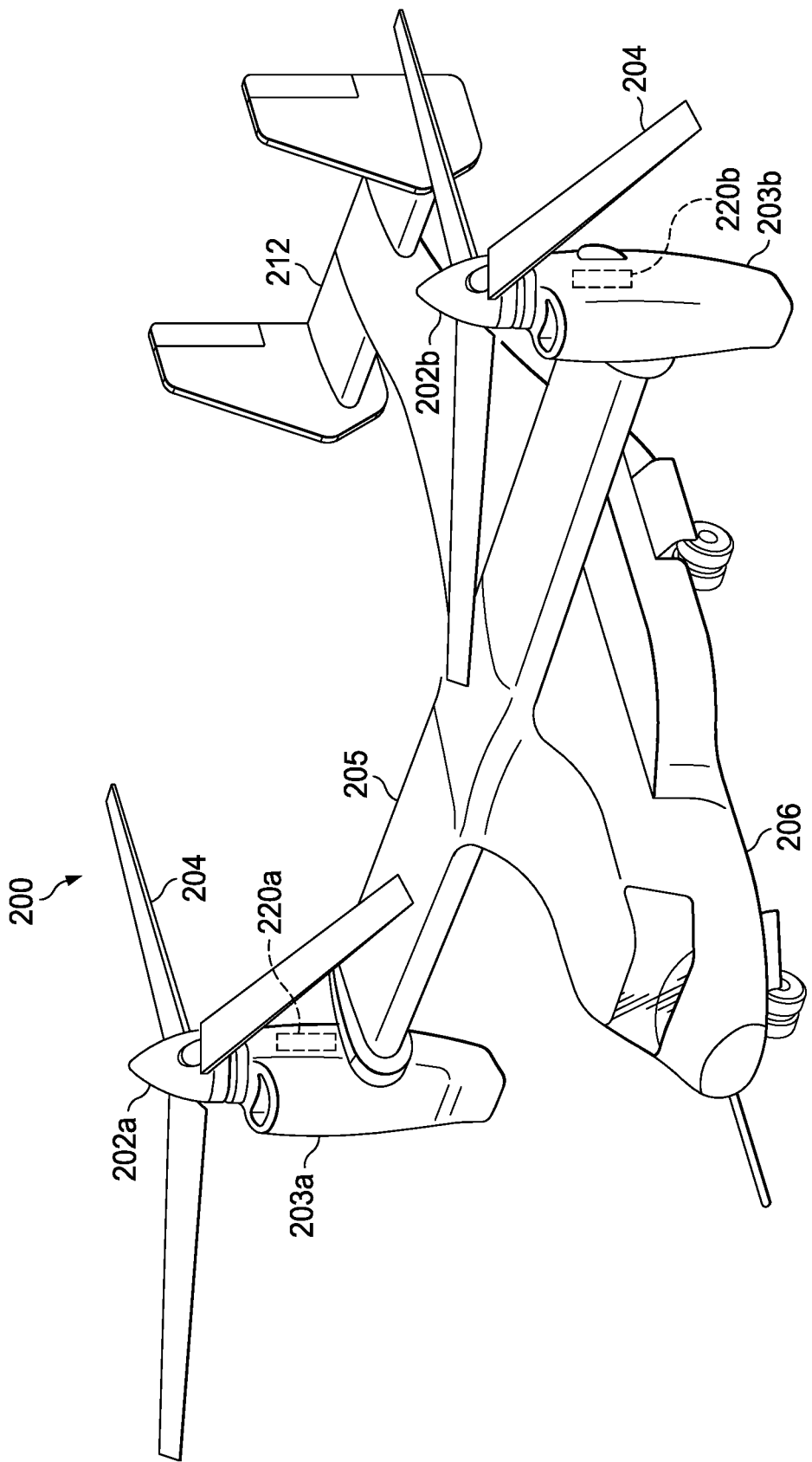
FIG. 2 is a simplified schematic diagram of another example aircraft, in accordance with certain embodiments.

FIG. 2 illustrates a perspective view of an example tiltrotor aircraft 200. Tiltrotor aircraft 200 includes nacelles 203a and 203b, a wing 205, a fuselage 206, and a tail structure 212. Nacelles 203a and 203b respectively include rotor systems 202a and 202b, and each rotor system 202a and 202b includes a plurality of rotor blades 204. Moreover, each nacelle 203a and 203b may include an engine and at least one gearbox 220a and 220b, respectively, for driving rotor systems 202a and 202b, respectively. In some embodiments, nacelles 203a and 203b may each be configured to rotate between a helicopter mode, in which the nacelles 203a and 203b are approximately vertical, and an airplane mode, in which the nacelles 203a and 203b are approximately horizontal. In the illustrated embodiment, tail structure 212 may be used as a vertical stabilizer.

It should be appreciated that rotorcraft 100 of FIGS. 1A-1B and tiltrotor aircraft 200 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

Prior aircraft component maintenance practices have several disadvantages. For instance, the prior methods of tracking usage and managing maintenance involve the use of simple usage metrics, such as flight hours or landings, to estimate the usage (and therefore damage) accrued on a component. This is because more complex usage measurements and models are often not compatible with simple paper or electronic records. These metrics are not necessarily an accurate reflection of the damage done to, or life remaining in, a component. Further, even these simple usage metrics are susceptible to errors. As one example, determining the number of flight hours on a component requires accurate aircraft configuration data. Thus, under prior maintenance practices, errors in configuration records often results in errors in the usage of components. As another example, when the usage metric reflects pilot estimates of flight hours, such estimates can be consistently higher than the actual number of flight hours because pilots are incentivized to maximize their recorded flight time.

Another disadvantage of prior maintenance practices is that data entry is done manually, regardless of whether the records are physical or electronic. Consequently, entering data to create and update the records can be labor intensive. Manual data entry is also prone to errors or omissions, which compromises the accuracy of the records. As one example, when a component is removed or installed on an aircraft, the maintainer must accurately record the usage values (e.g., flight hours) for each of the components, without getting the individual components and/or usage values mixed up.

Another disadvantage of prior maintenance practices is that they lack the ability to identify discrepancies and errors in the records. For example, if the records indicate that a particular component was installed on two different aircraft at the same time, the prior systems and methods would not identify this as a probable error and prompt the maintenance personnel to make a timely correction to the records. Such errors are, therefore, typically not identified until the records are relied upon, at which point it is often too late to make corrections because the correct underlying information is no longer available.

Another disadvantage of the prior methods and systems is that they are not capable of identifying errors in the maintenance activities themselves. For example, an aircraft maintainer might be tasked with removing a component from an aircraft are replacing it with a refurbished component. However, after removal, the aircraft maintainer might confuse the removed component with a refurbished one, before mistakenly reinstalling the previously removed component. In such circumstances, the records would reflect that the aircraft has a refurbished component when it does not.

Furthermore, record accessibility might be problematic, especially with regard to physical records or electronic records stored at a central location. The records would, ideally, move with the component, but they may become separated from the component (or even lost). Such records might not be accessible to aircraft crew or maintainers, especially when the aircraft is at a remote location.

A related disadvantage of existing maintenance practices that utilize electronic records is that delays in enterprise processing systems can compromise the availability of accurate records. For instance, the component usage reflected in the records might lag behind the actual usage by days or weeks due to delays in flight data transmission or processing. In such instances, aircraft maintainers must revert back to relying on simple usage metrics, such as flight hours, when a component is approaching the end of its useful life (even if more sophisticated usage models are employed) because the more precise calculation using up to date usage information is not available.

Consequently, a need exists for maintenance tracking and planning system that: (1) uses sophisticated models or calculations to more accurately determine the damage done to, or life remaining in, a component; (2) relies upon accurate flight-by-flight configuration data to ensure that the usage data recorded, or damage calculated, is associated with the correct component; (3) accurately and automatically records usage and maintenance information; (4) does not require manual creation and maintenance of records; (5) does not place a significant burden on the flight crew or aircraft maintenance personnel; (6) is capable of identifying discrepancies and errors in the data recorded; (7) is capable of identifying potential errors in the performance of maintenance activities; and (8) makes usage and maintenance information available to the flight crew or aircraft maintenance personnel, even in remote locations. These and other advantages of embodiments described herein will become apparent to one skilled in the art. The embodiments described herein and as set forth in the appended claims, may provide all or some of these advantages.

Figure 3A:
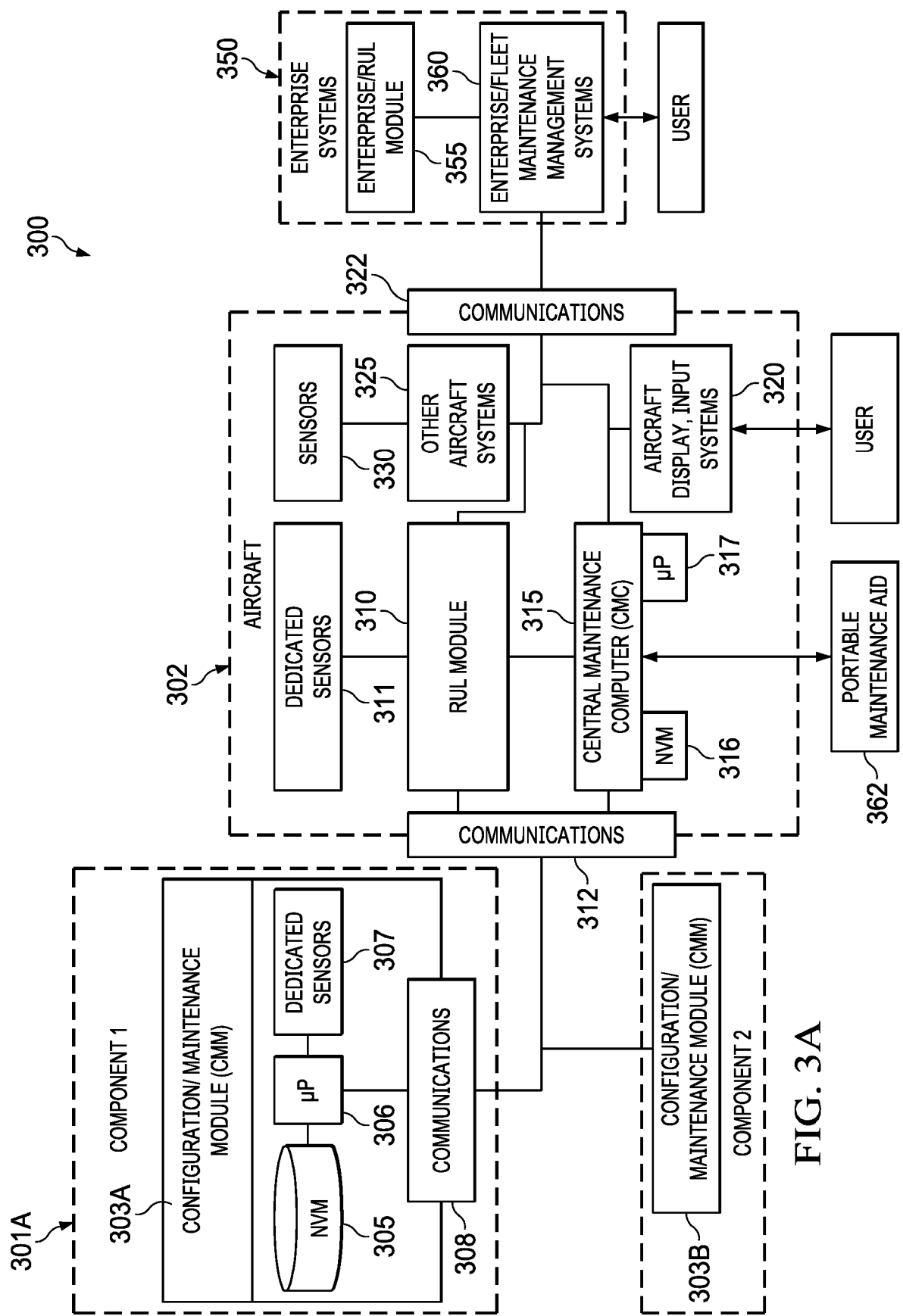
FIG. 3A is a block diagram of a component maintenance and usage tracking system as installed on an aircraft, according to one embodiment.

Referring now also to FIG. 3A, an exemplary component maintenance and usage tracking system 300 includes aircraft components 301A, 301B. The aircraft components 301A, 301B, may be various aircraft parts, assemblies, or systems. For example, aircraft components 301A, 301B, may, without limitation, be various drivetrain components, rotor system components, blade components, airframe components, and/or landing gear components, etc. In the embodiment of FIG. 3A, aircraft components 301A, 301B are two aircraft parts or assemblies that may be selectively installed on or otherwise associated with aircraft 302.

Each component 301A, 301B has an associated configuration/maintenance record module ("CMM") 303A, 303B. According to the embodiment of FIG. 3A, the CMM 303A is installed on component 301A, and CMM 303B is installed on component 301B. Installing, for example, CMM 303A directly onto component 301A ensures that the data stored on the CMM 303A (as described below) moves with the respective component 301A and will not become lost, separated from component 301A, or otherwise misidentified as being associated with a component other than component 301A. One skilled in the art will appreciate that, in alternative embodiments, a CMM (e.g., 303A) may be installed on aircraft 302 at a location proximate to the respective component (e.g., 301A). Installing CMM on the aircraft 302 at a location proximate to the respective component may be advantageous, for example, where mounting the CMM on the component itself would be difficult because of the component's size, location, space constraints, packaging, or operating environment. The CMMs 303A, 303B may each include non-volatile memory 305, a microprocessor 306, dedicated sensors 307, and a communication device 308. Unlike RFID tags (active or passive), this CMM 303A, 303B will include additional data (e.g., more than merely the information necessary to identify component 301A) as well as the ability to process information and generate new data (e.g., the ability to detect and record environmental conditions using dedicated sensors 307, and to update environmental history data stored in non-volatile memory 305, even when component 301A is not installed on aircraft 302).

Component maintenance and usage tracking system 300 further includes a remaining useful life ("RUL") module 310 and one or more dedicated sensors 311 in communication with RUL module 310. RUL module 310 is also in communication with CMM 303A, 303B via communication device 312. The communication link between communication device 312 and the communication device 308 of CMM 303A, 303B may be a wired or wireless connection.

As depicted in FIG. 3A, RUL module 310 is installed on aircraft 302. Optionally, RUL module 310 might be installed at a centralized location on aircraft 302 and configured to communicate with multiple CMMs associated with multiple respective components that are selectively installed on aircraft 302. One skilled in the art will readily appreciate that, alternatively, RUL module 310 may be installed directly on an associated component. For instance, in an alternative embodiment, RUL module 310 may be installed, along with CMM 303A, directly onto component 301A. In such an embodiment, an additional RUL module may be installed, along with CMM 303B, directly onto component 301B. In this way, each component 301A, 301B includes an associated CMM and an associated RUL module installed directly thereon.

Referring still to FIG. 3A, component maintenance and usage tracking system 300 further includes the following elements, each of which is installed on aircraft, such as aircraft 302, and may be in communication with each other, with RUL module 310, and/or with CMMs 303A, 303B: (1) an aircraft central maintenance computer ("CMC") module 315, which may include non-volatile memory 316 and a microprocessor 317; (2) aircraft display and input systems 320; and (3) aircraft avionics and vehicle management systems 325. General aircraft sensors 330 are installed on aircraft 302 and are in communication with aircraft avionics and vehicle management systems 325.

The embodiment of FIG. 3A optionally includes an enterprise fleet management system 350. Enterprise fleet management system 350 includes an enterprise RUL module 355 and an enterprise/fleet maintenance management system 360. Enterprise fleet management system 350 is in communication with aircraft 302 via communication device 322. One skilled in the art will appreciate that, in an alternative embodiment, enterprise fleet management system 350 could communicate with aircraft 302 via the same communication device 312 that provides a communication link with the CMMs 303A, 303B. The communication link between enterprise fleet management system 350 and aircraft 302 may be a wired or wireless connection.

Selected features and capabilities of the elements shown in FIG. 3A will now be described. The CMM 303A, 303B is configured to store within its non-volatile memory 305 information relating to the usage and maintenance history of the associated aircraft component 301A, 301B. Such information may include: (1) configuration data (e.g., part number, serial number, version or revision, anticipated future use, and/or aircraft ID for aircraft on which the component is/was installed); (2) maintenance records (e.g., installation and removal records, overhaul records, inspection records and results, and/or modification records); (3) usage history (e.g., flight-by-flight records of operation on aircraft, specific damage data, specific usage data such as flight hours, health and fault data, and/or metadata used to identify the model or algorithm used to generate usage history data/metrics); (4) environmental history (e.g., flight-by-flight records of operating environment on aircraft, and/or history of exposure to certain environmental conditions on or off of aircraft—temperature, humidity, salinity, corrosivity, impact, UV exposure, etc.); and (5) RUL values (e.g., one or more representations of the aircraft component's RUL based on configuration data, maintenance records, usage history, and/or environmental history). Similar to usage history data, the RUL values may include metadata used to identify the model or algorithm used to generate RUL data/metrics.

Figure 3B:
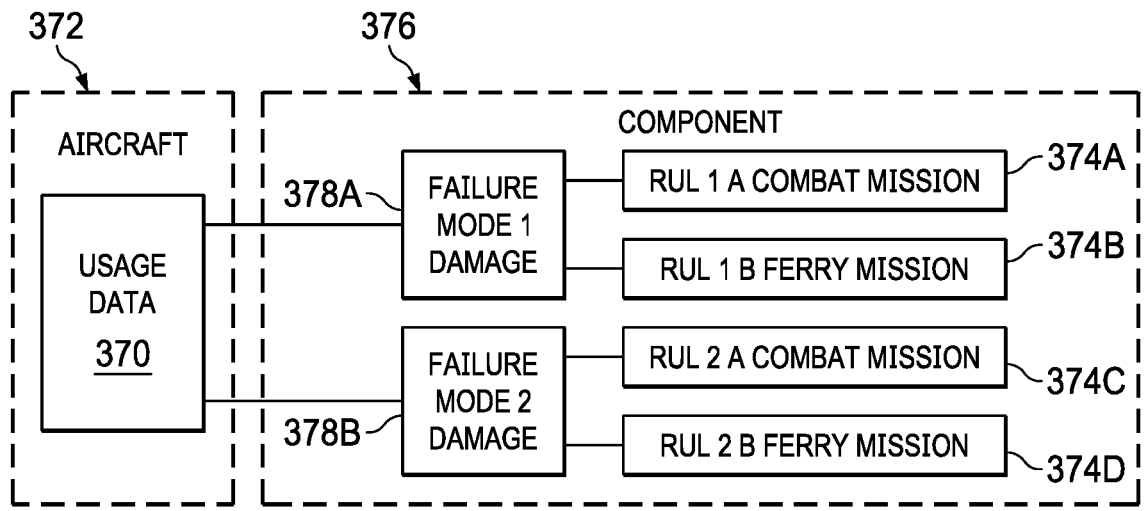
FIG. 3B is a simplified block diagram illustrating mapping of failure modes to remaining useful life ("RUL") values.

The CMM 303A, 303B may store multiple RUL values corresponding to various anticipated future uses. For instance, CMM 303A, 303B may store one or more RUL values based on configuration data that includes an anticipated future use of combat missions, and, additionally, one or more RUL values based on configuration data that includes an anticipated future use of ferry missions. More specifically, as illustrated in FIG. 3B, usage data 370 of an aircraft 372 may map to multiple RUL values 374A-374D used to track damage to a component 376 against multiple failure modes 378A-378B. For example, damage resulting from a first failure mode 378A ("Failure Mode 1") maps to a first RUL value 374A ("RUL 1A") for a combat mission and to a second RUL value 374B ("RUL 1B") for a ferry mission. Similarly, damage resulting from a second failure mode 378B ("Failure Mode 2") maps to a first RUL value 374C ("RUL 2A") for a combat mission and a second RUL value 374D ("RUL 2B") for a ferry mission.

Information from RUL module 310 and/or CMC module 315 may communicate with the CMM 303A, 303B in order to update or change the data stored on CMM 303A, 303B. More specifically, the CMM 303A, 303B may process information received via communication link 308 in order to make updates or changes to the various data types stored in non-volatile memory 305. Additionally, information from dedicated sensors 307 may be communicated to the CMM 303A, 303B in order to update or change the data stored on CMM 303A, 303B.

In one example, RUL module 310 and/or CMC module 315 may communicate to CMM 303A changes in the configuration data (e.g., that aircraft component 301A has been removed from one aircraft and installed on another, or that aircraft component 301A has been modified to a later version or revision). CMM 303A receives this information via communication link 308 and updates or changes the configuration data stored in non-volatile memory 305.

In another example, RUL module 310 and/or CMC module 315 may communicate to CMM 303A changes in the maintenance records (e.g., that aircraft component 301A has been removed, installed, inspected, overhauled, or modified). CMM 303A receives this information via communication link 308 and updates or changes the maintenance records stored in non-volatile memory 305.

In another example, RUL module 310 and/or CMC module 315 may communicate to CMM 303A changes in the usage history (e.g., flight-by-flight records of operation on aircraft). CMM 303A receives this information via communication link 308 and updates or changes the usage history stored in non-volatile memory 305.

In another example, RUL module 310 and/or CMC module 315 may communicate to CMM 303A changes in the environmental history (e.g., flight-by-flight records of operating environment on aircraft). The RUL module 310 and/or CMC module 315 may detect the need to make changes in the environmental history based on data from dedicated sensors 311 and/or general aircraft sensors 330. General aircraft sensors 330 include sensors that are already included on the aircraft for other purposes (e.g., altitude sensor, airspeed sensor, etc.) but whose data may be used in connection with component maintenance and usage tracking system 300. CMM 303A receives this information via communication link 308 and updates or changes the environmental history stored in non-volatile memory 305.

In another example, dedicated sensors 307 may communicate to CMM 303A changes in environmental history (e.g., that aircraft component 301A has been exposed to a certain level of humidity for a certain period of time). The changes in environmental history may be detected by dedicated sensors 307, even when aircraft component 301A is in storage and not installed on an aircraft. CMM 303A receives this information and updates or changes the environmental history stored in non-volatile memory 305.

The RUL module 310 is configured to calculate an RUL value for an aircraft component 301A, 301B based on historic data as well as current flight data. More specifically, RUL module 310 receives information from CMM 303A, 303B and current flight sensor data (from dedicated sensors 311 and/or general aircraft sensors 330), and RUL module 310 uses that information to calculate the various RUL values. For instance, RUL module 310 may store an algorithm for determining RUL values. RUL module 310 may receive data from CMM 303A via communication devices 308, 312. Such data may include configuration data, maintenance records, usage history, environmental history, and/or RUL values stored on CMM 303A for associated aircraft component 301A. RUL module 310 may further receive data relating to current flight information from dedicated sensors 311 and/or general aircraft sensors 330. The RUL module 310 may receive anticipated future use information from CMM 303A (as configuration data), CMC module 315, or aircraft display and input system 320.

RUL module 310 then processes through the algorithm for determining RUL values: (1) the data from CMM 303A; (2) the current flight information from sensors 311, 330; and (3) anticipated future use information. The calculation of RUL values may be based on usage data (e.g., simple counters—such as hours of operation or numbers of landings—or more complex usage data reflecting the recognition of certain flight regimes—such as time spent in a flight regime or the number of occurrences of specific operating conditions), environmental history (e.g., history of exposure to certain environmental conditions on or off of aircraft—temperature, humidity, salinity, corrosivity, impact, UV exposure, etc.), and/or health and fault data (e.g., the presence of a known system fault or degraded condition, which may correlate to a shorter RUL value). Calculation of the RUL values may be statistical in nature, or involve the use of statistical modeling, and, therefore, the RUL values reported may include some confidence level.

The anticipated future use information may be received from CMC module 315, from CMM 303A (as part of configuration data), or determined based on current flight information from sensors 311, 330, or based on recent flight data. The RUL module 310 may calculate multiple RUL values based on different anticipated future uses. With the benefit of multiple RUL values available, aircraft fleet managers may limit the usage of the aircraft 302 or component 301A, in order to prolong time before the next scheduled maintenance activity.

Once the RUL module 310 has determined the RUL values, the values may be communicated to CMM 303A via communication devices 308, 312 for storage in non-volatile memory 305. Additionally, RUL module 310 may communicate the RUL values to CMC 315, for example, in order to make the RUL values available to the flight crew or other user via aircraft display 320.

Additionally, RUL module 310 may receive updated usage history data, damage data, and/or RUL values from enterprise system 350. RUL module 310 may then store then communicate the updated data to CMM 303A for storing. As one example, enterprise RUL module 355 may use a higher-order algorithm (e.g., by relying on more, or more recent, flight-by-flight records in the usage history of component 301A, by relying on information from across a fleet of aircraft to model the damage to component 301A, and/or by performing a more complex calculation to determine the damage to component 301A) to determine more accurate damage values for aircraft component 301A. Enterprise system 350 then communicates the more accurate damage values to RUL module 310, via communication device 322. RUL module 310 then communicates the more accurate damage values to CMM 303A via communication device 312 for storage in non-volatile memory 305, in place of previously stored damage values. One skilled in the art will appreciate that this same process might be utilized for updating usage history, environmental history, or RUL values analyzed or determined at enterprise system 350.

The RUL module 310 may also receive updated algorithms for calculating RUL values from the enterprise system 350. For example, enterprise RUL module 355 may derive a more accurate algorithm (e.g., by relying on more, or more recent, flight-by-flight records in the usage history of component 301A, or by relying on information from across a fleet of aircraft to model the damage to component 301A) to determine more accurate damage values for aircraft component 301A. Enterprise system 350 then communicates the more accurate algorithm to RUL module 310, via communication device 322. RUL module 310 then recalculates RUL values using the more accurate algorithm to determine more accurate RUL values. RUL module 310 communicates the more accurate RUL values to CMM 303A via communication device 312 for storage in non-volatile memory 305, in place of previously stored RUL values. One skilled in the art will appreciate that this same process might be utilized for updating usage history, environmental history, or damage values.

The CMC module 315 tracks aircraft configuration through flight-by-flight queries to the CMMs 303A, 303B associated with each aircraft component 301A. 301B. In addition, CMC module 315 uses RUL values stored on the CMMs 303A, 303B associated with each aircraft component 301A. 301B in order to determine aircraft status (i.e., projected time until the next scheduled maintenance activity). CMC module 315 may also allow for manual entry of maintenance records through input from users. For example, if maintenance of aircraft component 301A was completed, a user may enter an updated maintenance record through aircraft display and input system 320. Additionally, a portable maintenance aid 362 may be provided for interfacing with the CMC module 315 to update maintenance records. The communication link between portable maintenance aid 362 and the CMC module 315 may be a wired or wireless connection. CMC module 315 receives communication of the updated maintenance record (from aircraft display, input systems 320 and/or portable maintenance aid 362) and communicates the updated maintenance records to RUL module 310 and/or CMM 303A (via communication devices 312, 308). CMM 303A may update the maintenance records for component 301A that are stored in non-volatile memory 305. RUL module 310 may recalculate RUL values for component 301A, based on the updated maintenance record, and then communicate the updated RUL values to CMM 303A (via communication devices 312, 308) for storage in non-volatile memory 305.

Aircraft avionics and vehicle management systems 325 (other aircraft systems) provide key inputs to the RUL module 310. These may include usage data and/or environmental data from aircraft sensors (such as altitude sensors, temperature sensors, airspeed sensors, etc.) and health and fault data. Alternatively, RUL module 310 may receive health and fault data from the CMC module 315.

Aircraft display and input system 320 and/or portable maintenance aid 362 allows a user to interface with the aircraft 302 and to review, analyze, and interpret the RUL and maintenance status of the aircraft 302. The user may use aircraft display and input system 320 and/or portable maintenance aid 362 to enter maintenance records or to select an anticipated future usage. Selecting a different anticipated future usage profile (e.g., combat missions in place of ferry missions) may result in the system 300 providing a different RUL value, maintenance status, or projection. Aircraft display and input system 320 and/or portable maintenance aid 362 may include a touchscreen, keyboard, or may involve RFID, optical, or other wireless interface devices to receive input from the user. For example, aircraft display and input system 320 and/or portable maintenance aid 362 may identify the maintainer who has performed a maintenance activity by automatically detecting and identifying the identification badge of the user as he is entering the associated maintenance record. Thus, when CMC module 315 receives communication of the updated maintenance record and communicates the updated maintenance records to RUL module 310 and/or CMM 303A (via communication devices 312, 308), the maintenance record includes the identity of the maintainer.

A communication system facilitates the transfer of data between component 301A, 301B (specifically, CMM 303A, 303B), aircraft 302 (specifically, RUL module 310, CMC module 315, aircraft display and input system 320, and aircraft avionics and vehicle management systems 325), and/or enterprise system 350 (specifically, enterprise RUL module 355 and enterprise/fleet maintenance management system 360. The communication system may be a data bus, wired, or wireless communication system as is well known in the art.

Enterprise fleet management system 350 may receive usage history data from the aircraft 302, or a fleet of such aircraft, and perform higher-order analysis to provide more accurate summary usage information, damage values, or RUL values. For instance, enterprise/fleet maintenance management system 360 may receive usage history data, maintenance records, and/or environmental history data from aircraft 302 via communication device 322. Enterprise/fleet maintenance management system 360 may compile this information along with similar information from other aircraft in a fleet of aircraft. Enterprise RUL module 355 may then use a higher-order algorithm (e.g., by relying on more, or more recent, flight-by-flight records in the usage history of component 301A, by relying on information from across a fleet of aircraft to model the damage to component 301A, and/or by performing a more complex calculation to determine the damage to component 301A) to determine more accurate damage values for aircraft component 301A. Enterprise system 350 then communicates the more accurate damage values to RUL module 310, via communication device 322. RUL module 310 then communicates the more accurate damage values to CMM 303A via communication device 312 for storage in non-volatile memory 305, in place of previously stored damage values. One skilled in the art will appreciate that this same process might be utilized for updating usage history, environmental history, or RUL values analyzed or determined at enterprise system 350. In addition, the enterprise RUL module 355 tracks software versions on the aircraft 302, particularly the software version and associated RUL algorithm stored in RUL module 310, and manages software updates to be pushed to the aircraft 302 for onboard calculations.

Figure 4:
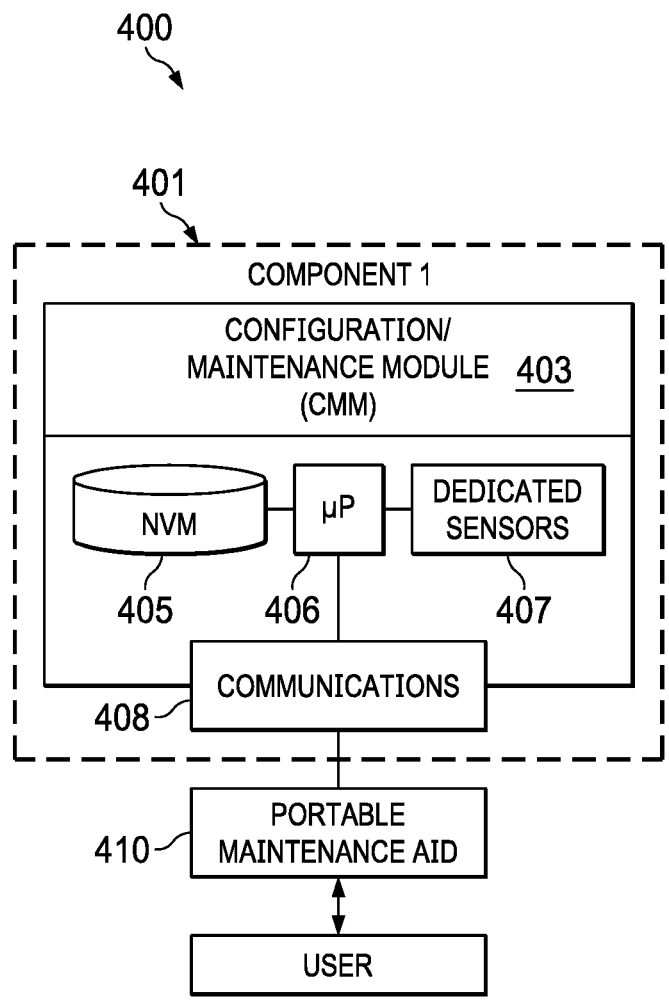
FIG. 4 is a block diagram of a component maintenance and usage tracking system as installed on a component, according to one embodiment.

Referring now also to FIG. 4, a component maintenance and usage tracking system 400 is depicted, which is associated with an aircraft component 401. Aircraft component 401 may be one of various aircraft parts, assemblies, or systems. For example, aircraft component 401 may be, without limitation, a drivetrain component, a rotor system component, a blade component, an airframe component, a landing gear component, etc. In the embodiment of FIG. 4, aircraft component 401 is an aircraft part or assembly that may be selectively installed on aircraft 302. However, the component maintenance and usage tracking system 400 of FIG. 4 may be used even when aircraft component 401 is not installed on aircraft 302. That is, the embodiment as depicted in FIG. 4 is not necessarily installed on aircraft 302, though one skilled in the art will readily appreciate that system 400 may be used regardless of whether aircraft component 401 is a component installed on aircraft 302.

Aircraft component 401 has an associated CMM 403. According to the embodiment of FIG. 4, the CMM 403 is installed on component 401. Installing CMM 403 directly onto component 401 ensures that the data stored on the CMM 403 (as described below) moves with the respective component 401 and will not become lost, separated from component 401, or otherwise misidentified as being associated with a component other than component 401. One skilled in the art will appreciate that, in alternative embodiments, CMM 403 may be kept at a location proximate to component 401. Keeping CMM 403 at a location proximate to the component 401 may be advantageous, for example, where mounting the CMM 403 on the component itself would be difficult because of the component's size, location, packaging, space constraints, or operating environment. The CMM 403 may include non-volatile memory 405, a microprocessor 406, dedicated sensors 407, and a communication device 408.

The component maintenance and usage tracking system 400 further includes a portable maintenance aid 410. Portable maintenance aid 410 may be in communication with CMM 403 via communication device 408. The communication link between portable maintenance aid 410 and the communication device 408 of CMM 403 may be a wired or wireless connection.

Selected features and capabilities of the elements shown in FIG. 4 will now be described. CMM 403 has substantially the same features, capabilities, and interfaces as described above with respect to CMMs 303A, 303B of FIG. 3A. However, CMM 403 is further configured to communicate with portable maintenance aid 410. Thus, CMM 403 has two interfaces, including a primary interface is for communication with the aircraft 302 and a secondary interface is for communication with portable maintenance aid 410. One skilled in the art will appreciate that both the primary and the secondary interfaces may be accomplished through a single communication device 408, which may facilitate either a wired or wireless connection.

Portable maintenance aid 410 allows a user to interface with CMM 403 in order to review, analyze, and interpret the RUL and maintenance status of the component 401. Use of portable maintenance aid 410 will be especially advantageous, for example, when the component 401 is not installed on aircraft 302, in which case communication with CMM 403 using aircraft display and input system 320 is not possible.

The user may also use portable maintenance aid 410 to enter maintenance records or to select an anticipated future usage. Selecting a different anticipated future usage profile (e.g., combat missions in place of ferry missions) may result in the system 400 providing a different RUL value, maintenance status, or projection. Portable maintenance aid 410 may include a touchscreen, keyboard, or may involve RFID, optical, or other wireless interface devices to receive input from the user. For example, portable maintenance aid 410 may identify the maintainer who has performed a maintenance activity by automatically detecting and identifying the identification badge of the user as he is entering the associated maintenance record. Thus, when portable maintenance aid 410 receives communication of the updated maintenance record and communicates the updated maintenance records to CMM 403 (via communication device 203), the maintenance record (which will be stored in non-volatile memory 405) includes the identity of the maintainer.

Figure 5:
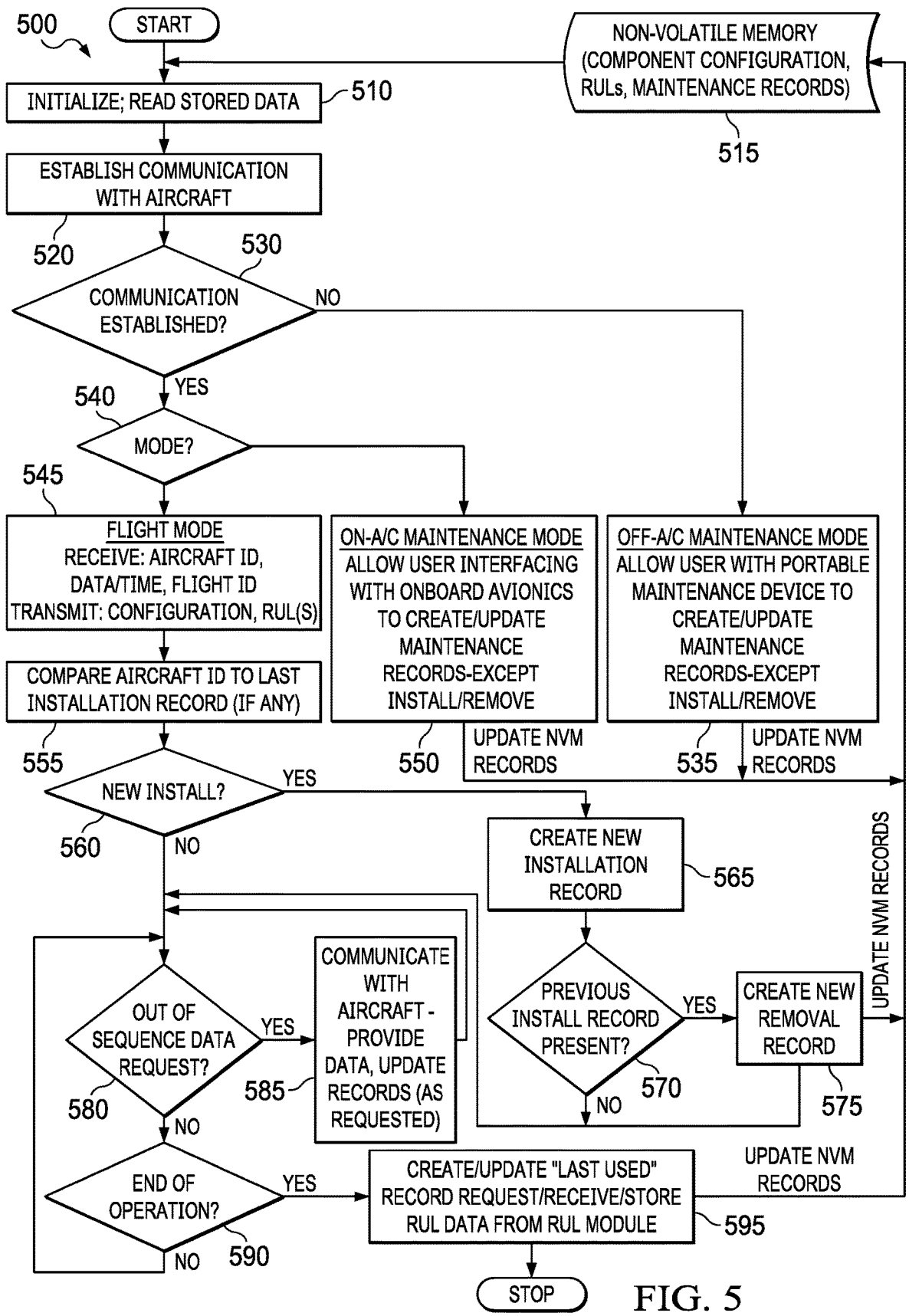
FIG. 5 is a flow chart representing a process for tracking maintenance and usage of a component according to one embodiment.

Reference will now also be made to FIG. 5, which is a flowchart illustrating a method 500 of tracking maintenance, usage, and remaining life using a module. In the nonlimiting example of FIG. 5, the module may be any one of CMMs 303A, 303B, or 403. For purposes of example, the method 500 will be described with reference to CMM 303A (FIG. 3). At step 510, CMM 303A is activated. Activating CMM 303A may include providing external power to CMM to power it on and initialize CMM. Alternatively, CMM 303A may have an internal power source, such that it stays in a "sleep" mode (to save power) until a signal is received from an external source. The external source (whether a source of power or a wake signal) may be generated from aircraft 302 or from portable maintenance aid 362.

Also occurring at step 510, CMM 303A reads its own stored data. The stored data is provided from non-volatile memory 305, at step 515. Non-volatile memory 305 stores key information about associated component 301A, including, for example: (1) configuration data (e.g., part number, serial number, version or revision, anticipated future use, and/or aircraft ID for aircraft on which the component is/was installed); (2) maintenance records (e.g., installation and removal records, overhaul records, inspection records and results, and/or modification records); (3) usage history (e.g., flight-by-flight records of operation on aircraft, specific damage data, specific usage data such as flight hours, health and fault data, and/or metadata used to identify the model or algorithm used to generate usage history data/metrics); (4) environmental history (e.g., flight-by-flight records of operating environment on aircraft, and/or history of exposure to certain environmental conditions on or off of aircraft—temperature, humidity, salinity, corrosivity, impact, UV exposure, etc.); and (5) RUL values.

Referring to step 520, once the data is read from non-volatile memory 305, the CMM 303A will attempt to establish communication with other aircraft systems via communication device 308. Principally, CMM 303A will attempt to establish communication with CMC module 315. Additionally, or alternatively, CMM may attempt to establish communication with RUL module 310. Establishing communication includes authenticating or confirming that component is installed on the aircraft. This may be established simply by short-range communication (either wired or wireless) and/or proximity. For example, a short-range wireless communication system might be utilized, such that CMM could be in communication range with aircraft systems only if component is installed on the aircraft. Alternatively, step 520 may include more elaborate means of determining the precise position of the component 301A relative to the aircraft to ensure that it is within the expected envelope for an installed component (and not, therefore, on an adjacent aircraft or off the aircraft but on a table adjacent the aircraft, for example).

At step 530, CMM 303A determines whether a connection with aircraft systems has been established. If a connection is not established because, for example, CMM 303A has not detected any aircraft systems within a certain period of time, then CMM will enter an off-aircraft maintenance mode. In off-aircraft maintenance mode, illustrated as step 535, the CMM 303A may establish communication with portable maintenance aid 362. Once CMM 303A is in communication with portable maintenance aid 362, a user may enter new configuration data and/or maintenance records (e.g., installation, removal, or maintenance activity relating to component 301A) using the portable maintenance aid 362. The new configuration data and/or maintenance records will be communicated to CMM 303A for storage in non-volatile memory 305. Optionally, the user may be restricted from entering certain special maintenance records or configuration records. For example, the user may be restricted from entering installation records using the portable maintenance aid 362; instead, installation records might be generated only when CMM 303A is in communication with aircraft systems.

Additionally, at step 535, CMM 303A may query its non-volatile memory 305 to determine whether, when CMM was last initialized, it was successful in establishing communication with aircraft systems. If CMM 303A was able to establish communication with aircraft systems at its last initialization, and it is now unable to do so, then CMM 303A might automatically enter a new maintenance record indicating removal from the aircraft. This removal record will typically be based on the "last used" record, i.e., the time when CMM 303A was last in communication with an aircraft. However, one skilled in the art will appreciate that in alternative embodiments the removal record might reflect: (1) the current time, which is when CMM 303A first fails to establish communication with an aircraft; or (2) some time in between the time when CMM was last able to establish communication with the aircraft, and the first time CMM fails to establish communication with the aircraft.

If, at step 530, CMM 303A determines that it has successfully established aircraft communication, then the CMM enters one of two on-aircraft modes, in which CMM is configured to receive and process data from the aircraft systems and store them as changes or updates in non-volatile memory 305. At step 540, CMM 303A determines which of the two on-aircraft modes it should enter. Determining which on-aircraft mode to enter may be based on data received from the aircraft systems. In one embodiment, the two on-aircraft modes include: (1) an on-aircraft maintenance mode, shown at step 550, in which the aircraft is not in operation and is undergoing maintenance; and (2) a flight mode, shown at step 545, in which the aircraft is in operation.

The on-aircraft maintenance mode (step 550) is similar to the off-aircraft maintenance mode (step 535), except that instead of portable maintenance aid 362 providing the user interface, the user may enter or confirm new configuration data and/or maintenance records (e.g., installation, removal, or maintenance activity relating to component 401) using aircraft display and input systems 320. The new configuration data and/or maintenance records will be communicated to CMM 303A for storage in non-volatile memory 305.

In flight (or "active") mode, data stored in non-volatile memory 305 is transmitted, confirmed, and/or updated at the start of each flight. Specifically, at step 545, the CMM 303A transmits to the aircraft systems configuration data and RUL values relating to component 301A. In return, CMM 303A receives aircraft ID, flight ID, and/or the current date and time.

At step 555, the CMM 303A performs a comparison between the current aircraft ID and the aircraft ID associated with the last installation record for the component 301A, based on the "last used" record, which is stored in non-volatile memory 305. As explained in greater detail below, the "last used" record includes the aircraft ID and date/time or flight ID as a marker for the time when component 301A was last used on an aircraft.

At step 560, the CMM 303A determines whether a new installation has occurred, based on the determination (at step 555) of whether the current aircraft is different from the previous aircraft. If the current aircraft is different from the previous aircraft or if the component is new and was not previously installed on any aircraft, then a new installation has occurred. In such circumstances, a new installation record is created at step 565, and the new installation record is written to non-volatile memory 305.

Additionally, when a new installation is detected at step 560, the aircraft systems may prompt a user to verify the installation record using aircraft display and input system 320. This will allow users to identify potential errors in maintenance activities. For example, if a new component 301A was scheduled to be installed, but, on startup, aircraft display and input system 320 does not prompt the user to confirm the installation, then the user may suspect that the installation was not performed or was performed improperly (e.g., where the old component was mistakenly reinstalled).

At step 570, CMM 303A determines whether there is any previous installation record. If a previous installation record was present, as opposed to a new component which was not previously installed on any aircraft, then a removal record may also be required. Step 575 reflects CMM 403 creating a new removal record. This removal record will typically be based on the "last used" record, i.e., the time when CMM 303A was last in communication with an aircraft. However, one skilled in the art will appreciate that in alternative embodiments the removal record might reflect: (1) the current time, which is when CMM 303A first fails to establish communication with the aircraft; or (2) some time in between the time when CMM was last able to establish communication with the aircraft, and the first time CMM fails to establish communication with the aircraft.

During flight operation, which includes ground time with the vehicle operating, out of sequence data requests may occur, as depicted at step 580. In response to such requests, at step 585, CMM 303A provides to the aircraft systems data stored in non-volatile memory 305 and/or stores updated data in non-volatile memory, as requested. For example, RUL module 310 may request from CMM 403 the latest RUL values stored in non-volatile memory 305. In response, CMM 303A provides the latest RUL values. RUL module 310 may calculate new RUL values based on the latest RUL values stored in non-volatile memory 305, combined with current flight data. RUL module 310 may then communicate the new RUL values to CMM 303A. In response, CMM 303A stores the new RUL values in non-volatile memory 305.

At the end of operation (step 590), the CMM 303A will create or update a "last used" record (step 595). The "last used" record includes the aircraft ID and date/time or flight ID as a marker for when the component 301A was last used. The "last used" record may eventually become a removal record, if the next time CMM 303A is initialized, it either fails to establish communication with the aircraft, or it establishes communication with a different aircraft. The "last used" record also prompts the RUL Module 310 to send updated data (e.g., new usage history, environmental history, new RUL values) to CMM 303A for storage in non-volatile memory 305. This updated data (e.g., new usage history, environmental history, new RUL values) will, therefore, stay with the component in the non-volatile memory 305 of CMM 303A so that, if the component is moved between aircraft, the new aircraft's RUL module 310 has information sufficient to determine and update the component's RUL values.

Figure 6:
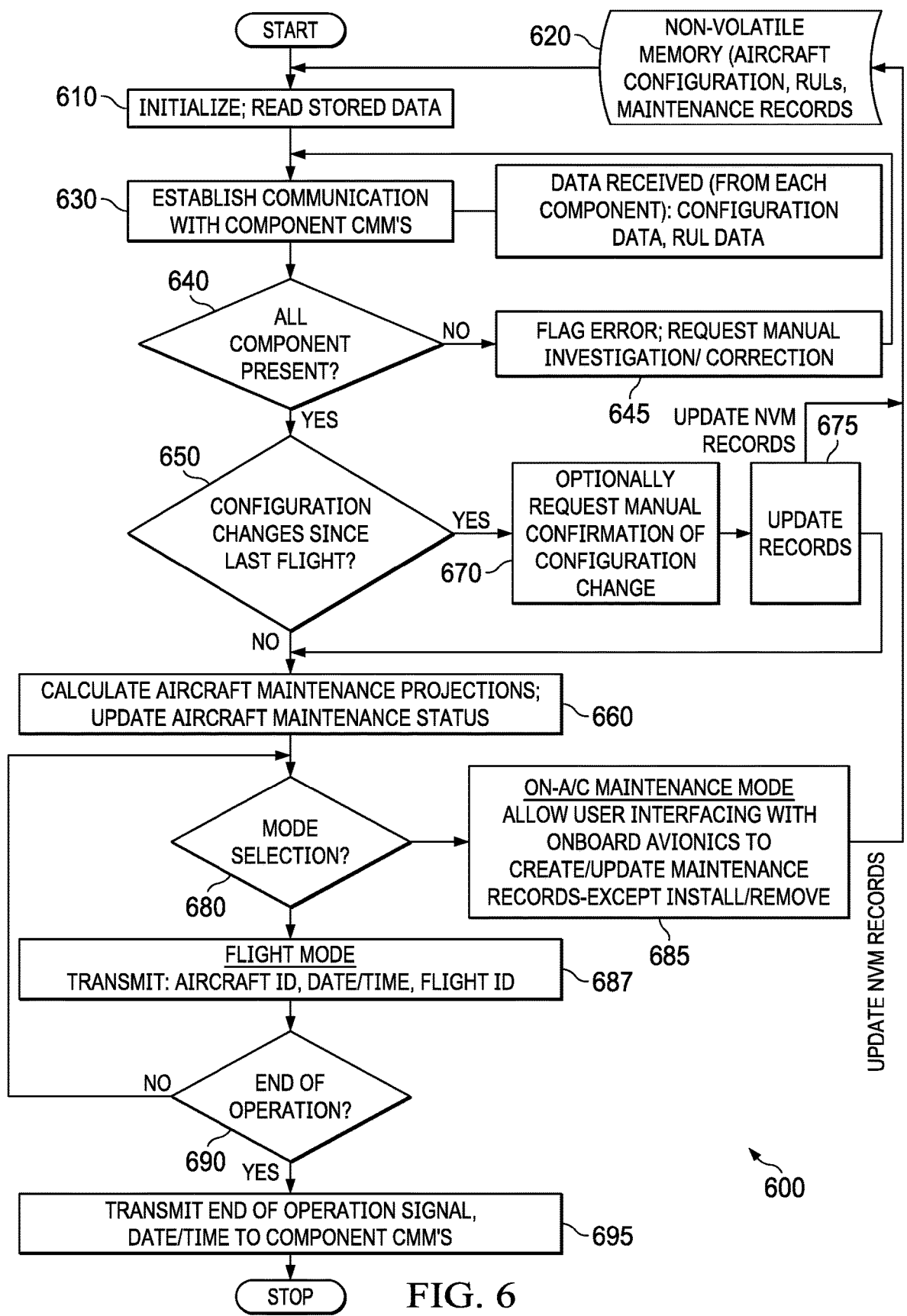
FIG. 6 is a flow chart representing a process for tracking maintenance and usage of a component according to one embodiment.

Reference will now also be made to FIG. 6, which is a flowchart illustrating a method 600 of tracking maintenance, usage, and remaining life using a module. In the nonlimiting example of FIG. 6, the module is CMC module 315. At step 610, CMC module 315 is activated. Activating CMC module 315 may include providing external power to CMC module 315 to power it on and initialize CMC module 315. Alternatively, CMC module 315 may have an internal power source, such that it stays in a "sleep" mode (to save power) until a signal is received from an external source. The external source (whether a source of power or a wake signal) may be generated from aircraft 302.

Also occurring at step 610, CMC module 315 reads its own stored data. The stored data is provided from non-volatile memory 316, at step 620. Non-volatile memory 316 stores key information about the aircraft 302, which may include: (1) aircraft configuration data (e.g., aircraft ID, flight ID, current time/date, part numbers/serial numbers/versions or revisions for installed components, and/or anticipated future use); (2) maintenance records (e.g., installation and removal records, overhaul records, inspection records and results, and/or modification records); and (3) RUL values for installed components.

Referring to step 630, once the data is read from non-volatile memory 216, the CMC module 315 will attempt to establish communication with CMMs (e.g., 303A) associated with various components (e.g., 301A) installed on the aircraft. Establishing communication with CMMs includes receiving component data stored on the CMMs, which may include, for example: (1) configuration data (e.g., part number, serial number, version or revision, anticipated future use, and/or aircraft ID for aircraft on which the component is/was installed); (2) maintenance records (e.g., installation and removal records, overhaul records, inspection records and results, and/or modification records); (3) usage history (e.g., flight-by-flight records of operation on aircraft, specific damage data, specific usage data such as flight hours, health and fault data, and/or metadata used to identify the model or algorithm used to generate usage history data/metrics); (4) environmental history (e.g., flight-by-flight records of operating environment on aircraft, and/or history of exposure to certain environmental conditions on or off of aircraft—temperature, humidity, salinity, corrosivity, impact, UV exposure, etc.); and (5) RUL values. Some or all of this data may be transmitted to enterprise system 350 (not shown in FIG. 6).

At step 640, CMC module 315 determines whether all installed components are present on the aircraft by ensuring that communication has been established with a CMM (e.g., 303A) associated with each component (e.g., 301A). If CMC module 315 determines that not all installed components are present, then, as shown at step 645, the CMC module 315 flags an error. The flagged error may be displayed, for example, on aircraft display and input systems 320. The flagged error may prompt the user to investigate, correct problems, and/or provide additional manual inputs relating to the components apparently not present. The flagged error may also prompt CMC module 315 to enter maintenance mode.

If all components are present, then, at step 650, the CMC module 315 determines whether there have been any configuration changes (i.e., changes in the components installed on the aircraft) since the last flight. More specifically, CMC module 315 performs a comparison between the current aircraft configuration (i.e., part numbers/serial numbers/versions or revisions for currently installed components) and the aircraft configuration associated with the last flight, based on the "last flight" record, which is stored in non-volatile memory 316. As explained in greater detail below, the "last flight" record includes the part numbers/serial numbers/versions or revisions for then-installed components, as a marker for the time when the aircraft was last in-flight mode.

When a configuration change is detected at step 650, the CMC module 315 may prompt a user to verify the installation record using aircraft display and input system 320. This step 670 will allow users to identify potential errors in maintenance activities. For example, if a new component (e.g., component 401) was scheduled to be installed, but, on startup, aircraft display and input system 320 does not prompt the user to confirm the installation, then the user may suspect that the installation was not performed or was performed improperly (e.g., the old component was mistakenly reinstalled).

Regardless, when a configuration change is detected at step 650, then at step 675 the CMC module 315 will create or update the aircraft configuration data stored in non-volatile memory 216. This updated aircraft configuration data becomes the baseline "last flight" record used to detect configuration changes at the beginning of the next flight.

Referring to step 660, based on RUL values received from CMMs (e.g., 303A) associated with various components (e.g., 301A), which were received at step 630, the CMC module 315 will determine overall aircraft maintenance projections. The overall aircraft maintenance projections may be based on various operational scenarios. For instance, the overall aircraft maintenance projections may be based on anticipated future use. The anticipated future use information may be received from CMMs (as part of configuration data). Alternatively, the anticipated future use may be determined based on current flight information from sensors 311, 330, or based on recent flight data. In another alternative embodiment, a user may use aircraft display and input system 320 to select an anticipated future usage. Selecting a different anticipated future usage profile (e.g., combat missions in place of ferry missions) may result in the system 400 providing an updated aircraft maintenance projection. The aircraft maintenance projections may include indicators that show the estimated time until maintenance is required (given assumed, determined, or input of anticipated future use, and a requested confidence level). These indicators may include a simple report of "projected time to next maintenance" value (i.e., the lowest RUL of any installed component). Alternatively, the indicator may include more complex maintenance projections (i.e., how much maintenance will be required, specific maintenance procedures that will be necessary, and at what time).

CMC module 315 may accept or recognize user inputs provided through aircraft display and input system 320. This allows users to evaluate different future use scenarios such as mission type (e.g., combat mission vs. ferry mission), usage severity (high vs. low), potential damage, equipment needed (e.g., surveillance vs. transport). In this way, usage projections may change based on the projected use scenarios. As a result, RUL for components may change. Additionally, required equipment may change, which may render RUL unimportant for components that are not necessary for certain mission types. As RULs for components changes (or becomes unimportant), so too changes the aircraft maintenance projections. Alternatively, the CMC module 315 may simultaneously send all projected maintenance scenarios to be displayed to users. In this scenario, user selections simply change the maintenance projections displayed, without requiring CMC module 315 to perform any new back-end analysis.

At step 680, the CMC module 315 will determine a mode selection. The mode selection may be manually selected or automatic based on certain logic (i.e., if engines are running, select flight mode). If the selected mode is a maintenance mode (step 685), then the user may enter or confirm new configuration data and/or maintenance records (e.g., installation, removal, or maintenance activity relating to a component) using aircraft display and input systems 320. Entry or confirmation of new configuration data and/or maintenance records which will update the non-volatile memory 316 associated with CMC module 315 (and, furthermore, the non-volatile memory (e.g., 405) associated with CMMs (e.g., 403)).

If the selected mode is a flight mode (step 687), no new configuration data and/or maintenance records may be entered. If the end of an operation is reached (step 690), then the CMC module 315 will send an end of the operation/flight signal to component CMMs (e.g., 303A) prompting the creation of "last used" records stored in non-volatile memory (e.g., 305) (step 695).

Figure 7:
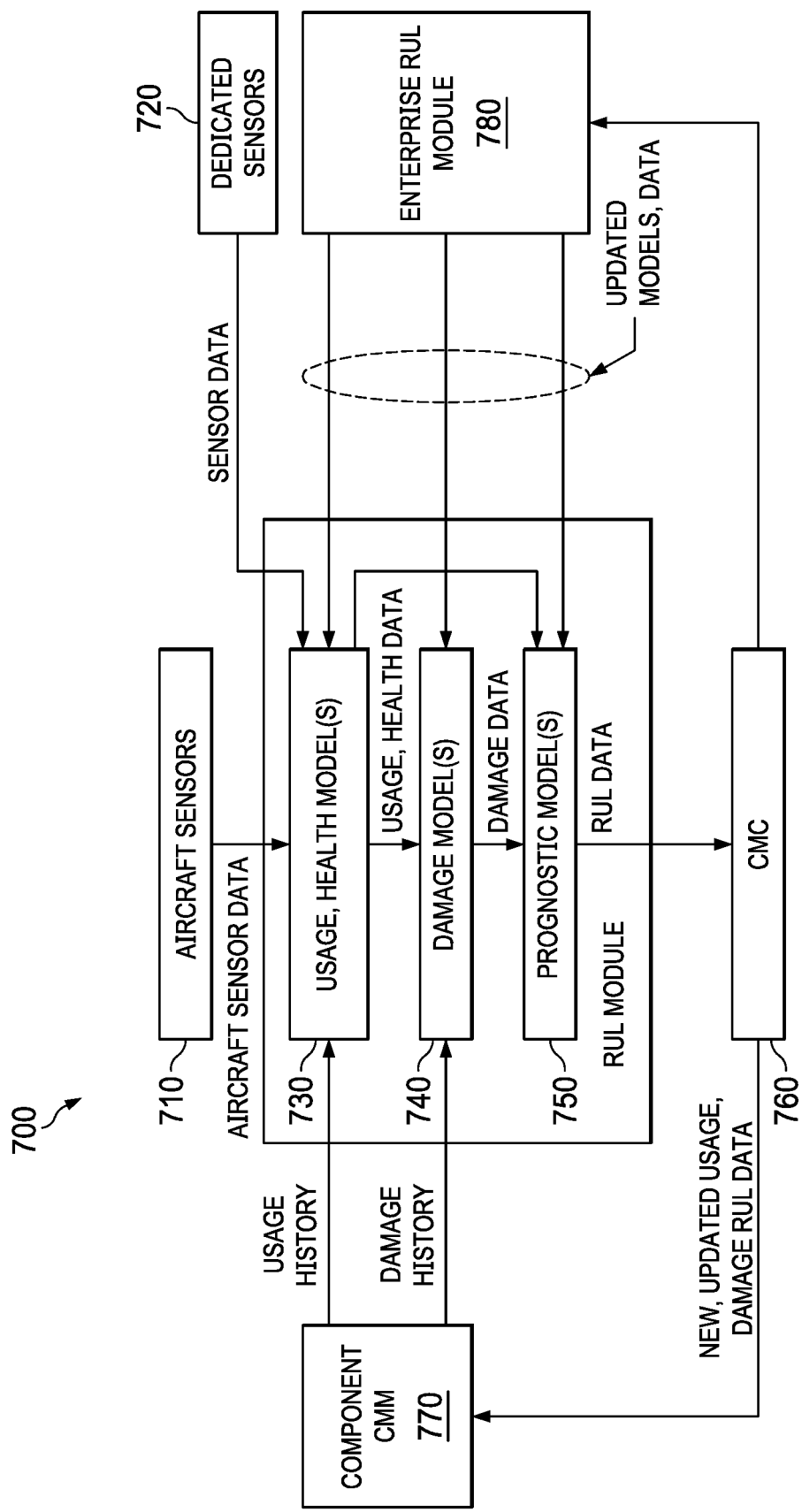
FIG. 7 is a flow chart representing a process for tracking maintenance and usage of a component according to one embodiment.

Reference will now also be made to FIG. 7, which is a flowchart illustrating a method 700 of tracking maintenance, usage, and remaining life using a module. In the nonlimiting example of FIG. 7, the module is RUL module 310.

At steps 710 and 720, the RUL module 310 receives sensor data from dedicated sensors 311 and/or general aircraft sensors 330. The sensor data is processed using a usage/health model (step 730) to generate usage/health data. As shown at step 770, the usage/health data generated at step 730 may also be based upon usage history and/or environmental history stored in the non-volatile memory 305 of CMM 303A. Usage/health models, and the data generated by them at step 730, may be applicable to multiple components.

The usage/health data generated at step 730 is the primary input into damage models, at step 740, which generates damage data. As shown at step 770, the damage data generated at step 740 may also be based upon damage history stored in the non-volatile memory 305 of CMM 303A. The damage models used at step 740 are component specific. That is, a given usage or environmental exposure will typically have a different impact on the lives of different components. Furthermore, a single component may have multiple damage models associated with different potential failure modes. For example, a given environmental exposure (such as salinity) might impact the life of a component with regard to one failure mode (such corrosion) while having little or no impact with respect to another failure mode (such as fatigue), so that multiple damage models may be used to determine the damage data for a single component. Consequently, one set of usage/health data may produce many sets of damage data, resulting from many different damage models.

The damage data (from step 740) and usage/health data (from step 730) are inputs into the prognostics models which are used to generate RUL values at step 750. Just as for damage models, a single component may have multiple prognostics models associated with different potential failure modes. Furthermore, a single component may have multiple prognostics models based on different anticipated future uses. Thus, there may be multiple RUL values associated with a single component's damage data and usage/health data.

According to the embodiment of FIG. 7, as shown at step 760, the RUL data is transmitted to CMC module 315, and then from CMC module 315 to CMMs (e.g., 303A). In alternative embodiments, the RUL module 310 may transmit RUL data directly to the CMMs (e.g., 303A).

For all three of these data sets (usage/health data, damage data, and RUL data), versioning metadata is attached to the data to provide context. Specifically, metadata may indicate the specific model or algorithm used to generate the data.

Additionally, at step 780, the optional enterprise RUL module 355 may receive data from the aircraft (either from the CMC module 315 or RUL module 310). Enterprise RUL module 355 may process the data separately and transmit back updated data. As one example, enterprise RUL module 355 may receive RUL data from the CMC module 315 and then use a higher-order algorithm (e.g., by relying on more—or more recent—flight-by-flight records in the usage/health data, by relying on information from across a fleet of aircraft to model the damage or RUL, and/or by performing a more complex calculation to determine the damage or RUL) to determine more accurate damage or RUL values. Enterprise RUL module 355 then communicates the more accurate damage values to RUL module 310.

The RUL module 310 may also receive from the enterprise RUL module 355 updated models or algorithms for calculating data. For example, enterprise RUL module 355 may derive a more accurate model (e.g., by relying on more, or more recent, flight-by-flight records in the usage history of component 301A, or by relying on information from across a fleet of aircraft to model the damage to component 301A) to determine more accurate damage values. Enterprise RUL module 355 then communicates the more accurate damage model to RUL module 310.

Simple Example

Although the above example embodiments are described with reference to aircraft, the embodiments may be utilized in connection with vehicles and associated vehicle components generally. Consider a simple example of the tread of the tire on car. While much of the following discussion seems overly complex for a component as simple as a tire, it is meant to be illustrative of approaches that may be applied to more complex and maintenance-critical components. Current maintenance practice involves periodic inspection for condition ("is there enough tread left?"). However, it is understood that during most of the life of the tire, such an inspection will be unnecessary since tread wears slowly, over time. One simple approach would be to simply monitor the miles of usage on the tire. This may require knowing (1) and usage on the tire when it was installed on the current vehicle; (2) the cumulative vehicle usage when the tire was installed; and (3) the latest cumulative vehicle usage. The tire usage is then: (previous tire usage)+(latest vehicle usage)−(vehicle usage at tire install). If this car is part of a fleet of similar cars, then tires may be moved from vehicle to vehicle on a regular basis to quickly replace tires which have failed. So, configuration tracking of when tires move may be involved. This is especially true if the need to swap tires is as a result of an urgent need to return a vehicle to service. Maintenance may also affect RUL. For example, repaired tires may have a different life expectancy than non-repaired tires.

In accordance with features of embodiments described herein, a CMM could be installed within each of the tires and a vehicle on which the tires are installed could scan the CMMs at the beginning of each trip. Each CMM includes a log of the respective tire's previous installation(s)/removal(s), its total mileage, and any maintenance events. The car could then calculate the remaining useful life on all of the tires and provide alerts when one or more tires are near the end of their useful life. An example table of data that may be stored in this module is shown in Table 1 below:

TABLE 1

| Configuration Maintenance | Model: Repair: | XM-001 Jul. 1, 2022 | Serial: Vehicle: | 00102076 A123 | Exp. Life: Mileage since repair: | 60000 8,017 |
|---|---|---|---|---|---|---|
| Total Mileage: | 24017 | | | | | |

Table I illustrates the summary information necessary for a vehicle to ascertain RUL. In this case, the vehicle could calculate RUL by comparing total mileage to tread life expectancy. However, since a repair has been conducted, the RUL of the repair may be calculated to determine if that failure is expected first. The tire's RUL is the lower of the two calculations. Note that, while the tire model and serial number is provided, that information may not be needed. At the end of a trip, the car may send information to the CMM of the tire to update usage (e.g., total mileage and mileage since repair). Due to the simple nature of the data, the car needs to only add the current trip's usage to the total usage in tire's CMM as read at the beginning of the trip.

In many cases, adding each trip's usage to the previous total(s) would be sufficient to ensure accurate records are maintained even when tires move between cars. However, it may be possible for failures in the system to cause errors, so it may be desirable to create a usage and configuration log that shows which tires were installed on each trip for each car. A periodic audit of the log could help determine whether any errors occurred in the trip to trip calculations. However, the log depends on recording a few things on every trip, including, for example: (1) the car's ID; (2) a trip ID (which could be a simple index or could include date/time information); (3) which tires (by model and serial number) are installed on the car; (4) the maintenance status (or changes in status) for each tire; and (5) usage data for each tire (e.g., how many miles for each trip and/or total usage). It will be noted that combining car ID and trip ID should create a globally unique identifier ("GUID") for the corresponding log entry. Additionally, the serial number alone or combined with the model of a tire is a QUID for the tire. In accordance with features of embodiments described herein, it is presumed that the car can determine which tires are installed on it by communicating with each tire's CMM. To prevent confusion with tires on nearby vehicles, the car may use communication methods that require direct contact (e.g., wires) or close proximity (e.g., very short-range wireless) to enable differentiation. More elaborate approaches, such as determination of position/distance of the tire relative to known positions on the vehicle, may be considered to ensure all errors are excluded. It will further be noted that maintenance status or changes in status for each tire is necessary to verify whether a different RUL is needed in the case of a repair.

With this data in hand, one could recalculate a tire's total usage trip-by-trip and then ensure that this matches the cumulative value stored in the tire's CMM. If so, the data is accurate. If not, a data update may need to be made (most likely through the car's systems which are in communication with the tire's CMM). An example of the log of a tire's history is shown below in Table 2:

TABLE 2

| Car ID | Trip ID | Trip Mileage | Tire 1 Model | Tire 1 Serial | Total Mileage | Mileage Since Repair |
|---|---|---|---|---|---|---|
| A123 | 1001 | 17.0 | XM-001 | 0102076 | 24017 | 8017 |
| A123 | 1000 | 1.0 | XM-001 | 0102076 | 24000 | 8000 |

TABLE 2-continued

| Car ID | Trip ID | Trip Mileage | Tire 1 Model | Tire 1 Serial | Total Mileage | Mileage Since Repair |
|---|---|---|---|---|---|---|
| A100 | 2702 | 100.0 | XM-001 | 0102076 | 23999 | 7999 |
| A100 | 2701 | 50.0 | XM-001 | 0102076 | 23899 | 7899 |

In certain embodiments, the log may be stored solely in an enterprise database. However, if the ability to communicate with the vehicle is limited (for example, in areas where cellular data reception is poor or non-existent), it may be preferable to store the information either on the vehicle or on the tire itself. In this manner, the car could always evaluate tire RUL with verified information. Another reason not to store such information solely on an enterprise server is evident when moving tires between vehicles when those vehicles are unable to communicate with the enterprise server. Again, having the log stored on the tire itself would allow the vehicle which receives this tire to read its entire history and verify the cumulative usage is correct with no external communication.

For repairs, a maintenance technician could interact with the tire's CMM using external tools/interfaces to add the information about the repair. Alternatively, this information could be added to the tire's CMM through the car's systems. In addition, maintenance technicians are often required to log their work performed. In the case of installations and removals, most of the information needed is stored in the log we previously showed. The tire in the table moved from vehicle A100 after it's trip 2702 to vehicle A123 on its trip 1000 (presumably, a date/time is also available). However, we have not associated the "who" with the "what." If the vehicle is powered-up (in a "maintenance" mode), then it could be scanning the tires' CMMs for changes in configuration, as well as for a maintainer's identification module (possibly a wireless communication device, whose proximity to the vehicle/tire at the time of installation/removal triggers a recording of this ID information). In this way, a maintainer need only verify that those tasks associated with their ID are correct (i.e., at the end of the day).

When a tire is finally removed at end of life, the tire's actual usage can be compared to expectation. To do this, tire configuration and usage data may be transmitted to a central database. This would allow the manufacturer to ascertain how many tires reach a certain expected life and how this will affect financial obligations like warranty.

Complex Usage

To this point, all usage data is assumed to be mileage. However, mileage alone may be a poor indicator of tread wear. Other factors could include vehicle speed, road surface, temperature, and brake applications. This information can be tied to damage models to determine how much life has been used on a given tire. For example, each brake application uses $1/100,000$ of the life of the tire (i.e., after 100,000 brake applications, a tire's tread is likely to be worn). Generically, one can say that Damage=f(usage).

Since multiple factors may influence the life used on a tire, multiple failure modes (and therefore multiple damage fractions) may be tracked. Consider tires who are lightly used over a long period of time and may suffer environmental degradation. In this case, the environmental damage may necessitate retirement before other usage (like mileage or brake applications) would. Therefore, multiple modes may be tracked and the first to reach a threshold value triggers maintenance. Since there may be multiple damage modes based on different usage (e.g., $\text{Damage}_x = f(\text{Usage}_a, \text{Usage}_b)$, $\text{Damage}_y = f(\text{Usage}_c)$, $\text{Damage}_z = f(\text{Usage}_a, \text{Usage}_c)$, etc.), it is desirable to be able to update damage models as more information becomes available. Therefore, keeping a history of (1) the version metadata of the damage model used and (2) the usage itself is necessary to enable such a capability. Consider the brake applications damage model. Enough tires have been in service to determine that the initial estimate of 100,000 brake applications for a tire's lifetime was too conservative, and that a new value of 150,000 brake applications (or, a damage of $1/150{,}000$ per brake application) is more accurate. If both the number of brake applications is being stored in the log, then this damage calculation could be updated. In this simple case, version metadata may not be needed, but in other cases, version metadata may be needed. It may be possible that damage calculated on different vehicles (with different software) may have different versions, so updates may need to be made at some point in the future to catch up the past history to latest damage calculation version.

An example of an updated simple log that includes some usage and damage data is shown below in Table 3.

indications, but RUL may be communicated to a car's operator in terms the user can understand, such as remaining mileage. However, predicting the future relationship of mileage to other factors that affect tread wear means making assumptions. One such assumption involves whether the tire's past usage or the vehicle's past usage may be the basis for prediction for future usage if the tire is moved among vehicles. In the simplest terms, RUL is based on current accumulated damage, a damage model to convert usage to damage, and predicted future usage. Consider the brake applications usage. If 80% of the life of a tire has been used based on brake applications, and RUL is to be determined in terms of miles for the tire, the damage model ($1/150{,}000^{th}$ life usage per brake application) can proceed if a certain number of brake applications per mile (the predicted future usage) is assumed. However, brake applications per mile are different for city versus highway driving, for example; therefore, if may be necessary to calculate two RUL's: one for city driving and one for highway driving. An operator could use this information to evaluate miles to tire replacement for each scenario or a mix of both scenarios.

In the previous example, a certain number of brake applications per mile were assumed; however, another approach would be to look at how a tire (or a vehicle) has been used and statistically evaluate normal (e.g., $50^{th}$ percentile) and severe (e.g., $95^{th}$ percentile) brake applications per mile by looking across the log data by trip. If the worst trip ever saw a brake usage of 10 brake applications per mile, it may be safe to use this value to conservatively calculate RUL. However, this would not be easily accomplished without having an on-board history (i.e., the log stored in the

TABLE 3

| Car ID | Trip ID | Trip Mileage | Brake Applications | Damage 1 | Damage 1 version | Damage 2 | Damage 2 version |
|--------|---------|--------------|--------------------|----------|------------------|----------|------------------|
| A123   | 1001    | 17.0         | 18                 | 0.0000015 | 1.1             | 0.000018 | 2.0              |
| A123   | 1000    | 1.0          | 2                  | 0.0000020 | 1.1             | 0.000011 | 2.0              |
| A100   | 2702    | 100.0        | 5                  | 0.0000079 | 1.1             | 0.000045 | 1.9              |
| A100   | 2701    | 50.0         | 10                 | 0.0000032 | 1.1             | 0.000033 | 1.9              |

Some of the data sources used for damage may have to partially come from external sources (e.g., road surface). In the case of road surface, a vehicle could record its GPS position on a periodic basis, and this information could be coupled to an external road surface database to determine exposure to various levels of roughness (and therefore wear) on said road surfaces. On a trip-by-trip basis, an updated damage value (and updated version metadata) may be uploaded to the log.

Since it may take some time to process such data in an enterprise system (or it may take some time for the vehicle to be able to communicate with the enterprise system), an onboard approximation may be used until enterprise data updates are available. Version metadata can show which damage values are based on onboard approximations and which are based on enterprise data. This could even enable the vehicle to send requests for missing updates or to determine how updates can be made due to data loss, etc. If a tire is reaching end of life and it is outside of communication with the enterprise, enough information is still available to make a determination about damage on a tire and potentially to remove it if necessary, all without communication with an enterprise system.

Complex RUL

Calculation of RUL may be more complex as well. Decoupling usage from mileage can provide more accurate CMM). Ultimately, each failure mode may require multiple usage scenarios, and this may generate different RUL values for each.

The flowcharts and diagrams in the Figures illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A system comprising:
a vehicle;
a vehicle component for installation on the vehicle, the vehicle comprising a central maintenance computer ("CMC");
a configuration/maintenance module ("CMM") installed on the vehicle component, the CMM comprising:
  a non-volatile memory including information regarding the vehicle component, the vehicle component information comprising at least one of configuration data for the vehicle component, maintenance records for the vehicle component, usage history for the vehicle component, environmental history for the vehicle component, at least one damage model for the vehicle component, and at least one remaining useful life ("RUL") value for the vehicle component;
  a sensor that detects a condition of the vehicle component and generates data indicative of the detected condition;
  a microprocessor that processes the data generated by the sensor and updates the vehicle component information using results of the processing; and
  a communications interface that enables communication between the CMM and the CMC; and
an RUL module associated with the vehicle, the RUL module periodically updating the at least one RUL value for the vehicle component based on at least one of the information stored in the CMM, current information obtained from sensors associated with the vehicle, and projected future use information, and communicating the updated at least one RUL value to the CMM for storage in the non-volatile memory;
wherein the CMC communicates with the CMM to update the vehicle component information included in the non-volatile memory based on at least one of information input to the CMC by a user and changes in a condition of the vehicle.

2. The system of claim 1, wherein the CMM is physically located in or on the vehicle component.

3. The system of claim 1, wherein the CMM is physically located in or on the vehicle proximate to and within range of communication of the vehicle component a using short-range communications system.

4. The system of claim 1 further comprising an enterprise system, the enterprise system communicating with the RUL module for updating information used by the RUL module to update the at least one RUL value for the vehicle component.

5. The system of claim 1 further comprising at least one of a portable maintenance aid and an aircraft display and input system for enabling a user to interface with the CMM to access and update a record comprising the vehicle component information.

6. The system of claim 5, wherein the portable maintenance aid comprises an interface for automatically reading an identification badge of the user updating the record and storing an identify of the user with the updated record.

7. The system of claim 1, wherein the CMC is communicatively coupled to a plurality of CMMs and wherein each one of the plurality of CMMs is associated with a different one of a plurality of vehicle components.

8. The system of claim 1, wherein RUL module calculates multiple RUL values for the vehicle component, wherein each of the multiple RUL values is based on a different set of projected use information.

9. The system of claim 1, wherein the vehicle component comprises an aircraft component and the vehicle comprises an aircraft.

10. An aircraft comprising:
a central maintenance computer ("CMC");
an aircraft component having installed thereon a configuration maintenance module ("CMM"), the CMM comprising:
a non-volatile memory including information regarding the aircraft component, the aircraft component information comprising at least one of configuration data for the aircraft component, maintenance records for the aircraft component, usage history for the aircraft component, environmental history for the aircraft component, at least one damage model for the aircraft component, and at least one remaining useful life ("RUL") value for the aircraft component;
a sensor that detects a condition of the aircraft component and generating data indicative of the detected condition;
a microprocessor that processes the data generated by the sensor and for updating the aircraft component information using results of the processing; and
a communications interface that enables communication between the CMM and the CMC; and
an RUL module associated with the aircraft, the RUL module periodically updating the at least one RUL value for the aircraft component based on at least one of the information stored in the CMM, current information obtained from sensors associated with the aircraft, and projected future use information, and communicating the updated at least one RUL value to the CMM for storage in the non-volatile memory;
wherein the CMC communicates with the CMM to update the aircraft component information included in the non-volatile memory based on at least one of information input to the CMC by a user and changes in a condition of the aircraft.

11. The aircraft of claim 10, wherein the CMM is physically located in or on the aircraft component.

12. The aircraft of claim 10, wherein the CMM is physically located in or on the aircraft proximate to and within range of communication of the vehicle component a using short-range communications system.

13. The aircraft of claim 10 further comprising an enterprise system, the enterprise system communicating with the RUL module for updating information used by the RUL module to update the at least one RUL value for the aircraft component.

14. The aircraft of claim 10 further comprising a portable maintenance aid for enabling a user to interface with the CMM to access and update aircraft component information, wherein the portable maintenance aid comprises an interface for automatically reading an identification badge of a user updating a record comprising the aircraft component information and storing an identify of the user with the updated record.

15. The aircraft of claim 10, wherein the CMC is communicatively coupled to a plurality of CMMs and wherein each one of the plurality of CMMs is associated with a different one of a plurality of aircraft components.

16. The aircraft of claim 10, wherein RUL module calculates multiple RUL values for the aircraft component, wherein each of the multiple RUL values is based on a different set of projected use information.

17. A method comprising:
receiving at a configuration/maintenance module ("CMM") installed on an aircraft component an activation signal from an external source, the CMM comprising a non-volatile memory including information regarding the aircraft component, the aircraft component information comprising at least one of configuration data for the aircraft component, maintenance records for the aircraft component, usage history for the aircraft component, environmental history for the aircraft component, at least one damage model for the aircraft component, and at least one remaining useful life ("RUL") value for the aircraft component;
subsequent to receipt of the activation signal, detecting by the CMM whether the aircraft component is installed on an aircraft including a central maintenance computer ("CMC");
if the CMM detects that the aircraft component is installed on an aircraft, determining whether the aircraft on which the CMM is installed is in active mode;
if it is determined that the aircraft is in active mode:
determining whether the aircraft component is installed on a different aircraft than the aircraft component was previously installed on and if so, adding a new installation record to and removing a previous installation record from the aircraft component information;
storing a last used record in the non-volatile memory;
receiving an updated RUL value from an RUL module, the updated RUL value determined by the RUL module based on at least one of the information stored in the CMM, current information obtained from sensors associated with the vehicle, and projected future use information, and communicating the updated at least one RUL value to the CMM for storage in the non-volatile memory; and
storing the updated RUL value in the non-volatile memory; and
if it determined that the aircraft is not in active mode, updating by a user interfacing with the CMC at least a portion of the aircraft component information.

18. The method of claim 17 further comprising, if the CMM detects that the aircraft component is not installed on an aircraft, determining that the CMM is connected to a portable maintenance aid, the portable maintenance aid for enabling a user to interface with the CMM to access and update aircraft component information.

19. The method of claim 18 further comprising:
automatically reading by the portable maintenance aid an identification badge of a user to determine an identity of the user;
updating a record comprising the aircraft component information; and
storing the determined user with the updated record.

20. The method of claim 17 further comprising:
receiving a request from the CMC related to the aircraft component information; and
responding by the CCM to the CMC request.

* * * * *